(12) United States Patent
Watanabe et al.

(10) Patent No.: US 9,091,341 B2
(45) Date of Patent: Jul. 28, 2015

(54) TRANSMISSION AND VEHICLE PROVIDED THEREWITH

(71) Applicant: Yamaha Hatsudoki Kabushiki Kaisha, Iwata-shi, Shizuoka (JP)

(72) Inventors: Kenta Watanabe, Shizuoka (JP); Akira Muraoka, Shizuoka (JP); Takuya Hanano, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 89 days.

(21) Appl. No.: 13/676,147

(22) Filed: Nov. 14, 2012

(65) Prior Publication Data

US 2013/0239716 A1    Sep. 19, 2013

(30) Foreign Application Priority Data

Mar. 15, 2012 (JP) ................................ 2012-059424

(51) Int. Cl.
| | | |
|---|---|---|
| *F16H 61/16* | (2006.01) | |
| *F16H 63/18* | (2006.01) | |
| *F16H 61/18* | (2006.01) | |

(52) U.S. Cl.
CPC ............... *F16H 61/16* (2013.01); *F16H 61/18* (2013.01); *F16H 63/18* (2013.01); *B60Y 2200/12* (2013.01); *F16H 2061/185* (2013.01); *Y10T 74/19251* (2015.01)

(58) Field of Classification Search
CPC ........... F16H 3/08; F16H 57/00; F16H 61/00; F16H 63/18; F16H 2061/185; F16H 61/16; F16F 1/00; B60K 6/35; B60K 6/40; B60K 6/445; B60K 6/547; B60L 11/14; B62M 11/00

USPC .............. 74/325, 335, 337.5, 473.21–473.22, 74/473.24–473.26
See application file for complete search history.

(56) References Cited

U.S. PATENT DOCUMENTS

| | | | | |
|---|---|---|---|---|
| 3,581,600 | A * | 6/1971 | Holdeman ................... | 74/665 R |
| 3,815,436 | A * | 6/1974 | Morimoto et al. .......... | 74/473.22 |
| 4,455,884 | A * | 6/1984 | Tsuruta et al. .............. | 74/473.28 |
| 4,491,031 | A * | 1/1985 | Ooka ........................... | 74/337.5 |
| 4,958,997 | A * | 9/1990 | Harwath ....................... | 418/171 |
| 5,085,092 | A * | 2/1992 | Koga ............................... | 74/333 |
| 6,308,797 | B1 * | 10/2001 | Hacker et al. ................. | 180/230 |
| 6,725,962 | B1 * | 4/2004 | Fukuda .......................... | 180/292 |
| 7,140,349 | B2 * | 11/2006 | Hanasato ...................... | 123/336 |
| 2008/0073172 | A1 * | 3/2008 | Ho ............................... | 192/13 A |

FOREIGN PATENT DOCUMENTS

| | | |
|---|---|---|
| JP | 57-012163 A | 1/1982 |
| JP | 57-138484 A | 8/1982 |
| JP | 64-049743 A | 2/1989 |

* cited by examiner

*Primary Examiner* — William Kelleher
*Assistant Examiner* — Thomas Magnuson
(74) *Attorney, Agent, or Firm* — Keating & Bennett, LLP

(57) ABSTRACT

A transmission includes an input shaft which rotates synchronously with a crankshaft, an output shaft, which rotates synchronously with a driving wheel, a shift drum of a rotary type which engages with a shift fork to drive at least one slide gear, and a rotary stopper mechanism including a friction spring frictionally engaged in a circumferential recessed groove provided in an outer periphery of the output shaft, a rocker arm biased by the friction spring toward the shift drum in accordance with rotation of the output shaft, and an engagement recessed portion provided in an outer periphery of the shift drum to restrict rotation of the shift drum through engagement with the rocker arm. Accordingly, cost is reduced as compared to a conventional transmission, and heat generation of the friction spring is minimized.

7 Claims, 4 Drawing Sheets

TRANSMISSION AND VEHICLE PROVIDED THEREWITH

CROSS-REFERENCE TO RELATED APPLICATION

The present application claims priority from Japanese application JP 2012-059424 filed on Mar. 15, 2012, the contents of which are hereby incorporated by reference into this application.

BACKGROUND OF THE INVENTION

1. Field of the Invention

The present invention relates to a transmission and a vehicle provided with the transmission.

2. Description of the Related Art

Transmissions which are used for motorized vehicles, such as a motorcycle, include a type using a rotary shift drum, where some transmissions of this type include a mechanism called a rotary stopper. This mechanism is provided to restrict shifting from top gear into a neutral position during running of the vehicle in a transmission in which gears are shifted from top gear (for example, 4th gear) into the neutral position directly as being shifted from the neutral position into 1st gear, 2nd gear, and further into higher gears so as to increase a gear ratio because a sudden engine brake is generated, for example, when the gears are shifted from 4th gear into the neutral position and further into 1st gear during running of the vehicle.

As such a mechanism, for example, JP 57-138484 A discloses a gearbox for a motorcycle provided with a rotary stopper having the following structure. A friction spring is fitted and frictionally engaged in a recessed groove provided in a side surface of a high-speed driven gear. The friction spring biases a locking piece so as to swing the same during rotation of the high-speed driven gear. The locking piece engages with an engagement portion of a shift drum to thereby prevent the shift drum from rotating to a low-speed shift position.

Further, JP 64-049743 A discloses a gearbox for a vehicle provided with a rotary stopper having the following structure. A rocker arm is biased by a friction spring frictionally engaged on a boss portion 62 of a second gear 29B, and is pivotally fitted to a shift fork shaft.

JP 57-012163 A discloses a gearbox for a motorcycle provided with a rotary stopper having the following structure. A friction spring is frictionally engaged on a center boss spline-coupled to an output shaft, and the friction spring biases a locking piece.

As a member with which the friction spring is frictionally engaged, the above-mentioned mechanisms require a gear that additionally has a special structure such as the recessed groove or the boss portion, or require a member that costs time and money for processing the center boss or the like to include a spline groove. This leads to an increase in the cost of the rotary stopper mechanism.

Further, the friction spring is frictionally engaged with a member coupled to the output shaft of the transmission, and hence a sliding portion of the friction spring generates heat by friction during rotation of the output shaft. Lubricating oil can be sufficiently supplied to the sliding portion of the friction spring during operation of the engine, and hence the sliding portion is lubricated and cooled. However, in a case where the engine is stopped, for example, and if the vehicle is in a neutral state and running down a slope at high speed, the sliding portion of the friction spring may be heated to a high temperature.

SUMMARY OF THE INVENTION

In view of the above-mentioned circumstances, preferred embodiments of the present invention provide a rotary stopper mechanism which is inexpensive compared to a conventional mechanism and capable of minimizing heat generated by a friction spring.

The present invention of the subject application encompasses various exemplary preferred embodiments, and a summary of these representative preferred embodiments of the present invention is as follows.

A transmission according to a preferred embodiment of the present invention includes an input shaft which rotates synchronously with a crankshaft of an engine through an intermediate clutch, an output shaft which rotates synchronously with a driving wheel, a shift drum of a rotary type which engages with a shift fork to drive at least one of a slide gear fitted on the input shaft and a slide gear fitted on the output shaft, and a rotary stopper mechanism including a friction spring which is frictionally engaged in a circumferential recessed groove provided in an outer periphery of the output shaft, a rocker arm which is biased by the friction spring toward the shift drum in accordance with rotation of the output shaft, and an engagement recessed portion provided in an outer periphery of the shift drum to restrict rotation of the shift drum through engagement with the rocker arm.

It is preferred that the circumferential recessed groove is arranged between an output-shaft-side stationary gear which is mounted to the output shaft so as to be stationary with respect to the output shaft in both an axial direction and a rotational direction, and an output-shaft-side rotary gear which is mounted to the output shaft so as to be stationary in the axial direction and free to rotate in the rotational direction with respect to the output shaft.

The slide gear fitted on the input shaft preferably moves in the axial direction so as to switch between a state in which the output-shaft-side stationary gear and the input shaft rotate synchronously with each other and a state in which the output-shaft-side rotary gear and the input shaft rotate synchronously with each other.

The circumferential recessed groove is preferably arranged at a position adjacent to the output-shaft-side stationary gear.

The output-shaft-side stationary gear is preferably fixed to the output shaft by being press-fitted into the output shaft from a direction opposite to the circumferential recessed groove.

The rocker arm is preferably supported so as to be rotatable about a position different from a rotation center of the output shaft.

A vehicle according to another preferred embodiment of the present invention includes a transmission according to any one of the preferred embodiments described above.

According to a preferred embodiment of the present invention, it is unnecessary to add a special structure such as the recessed groove or the boss portion to a gear, or to add a member that costs time and money to process the center boss or the like to include a spline groove. Thus, the rotary stopper mechanism is inexpensive compared to a conventional mechanism, and a diameter of a member to be nipped by the friction spring is reduced. Further, there is reduced a relative velocity between the friction spring and a member with which the friction spring is frictionally engaged. Accordingly, it is possible to attain a rotary stopper mechanism capable of minimizing heat generated by the friction spring.

According to a preferred embodiment of the present invention, the friction spring can be arranged using a gap which is provided between the output-shaft-side stationary gear and the output-shaft-side rotary gear. Hence, provision of the rotary stopper mechanism leads to no increase in the overall length of the transmission, or the increase in the overall length is minimized. Accordingly, a cost increase due to the increase in the overall length of the transmission and an increase in the size of the transmission are prevented.

According to a preferred embodiment of the present invention, the recessed groove which accommodates the friction spring therein doubles as a stress relaxation mechanism for a stress generated at the output shaft. Thus, without providing additional structure or processing, it is possible to reduce the stress which is generated at the output shaft by a torque acting on the output-shaft-side stationary gear. Accordingly, a cost increase due to the additional structure and processing for relaxing the stress generated at the output shaft is prevented.

According to a preferred embodiment of the present invention, the output-shaft-side stationary gear does not slide across the recessed groove when the output-shaft-side stationary gear is press-fitted, and hence it is possible to prevent damage to the output-shaft-side stationary gear or the output shaft which is caused when the output-shaft-side stationary gear is caught in the recessed groove at the time of press-fitting. Accordingly, the manufacturing yield is increased, and a cost increase due to the occurrence of defects is prevented.

According to a preferred embodiment of the present invention, as compared to a case where the rocker arm is mounted so as to rotate about the output shaft, it is possible to reduce a distance between a fulcrum of the rocker arm and a point of action thereof. Thus, even when the friction spring is mounted on an outer periphery of the output shaft having a smaller diameter than that of a conventional output shaft so that a torque to bias the rocker arm is reduced, a reduction in the torque to bias the rocker arm toward the shift drum is prevented. Accordingly, it is unnecessary to increase a force of nipping the output shaft by the friction spring, and it is possible to minimize heat generated by the friction spring.

According to another preferred embodiment of the present invention, it is possible to provide a vehicle including a rotary stopper mechanism having any one of the advantageous effects described above.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention are described with reference to the drawings.

Figure 1:
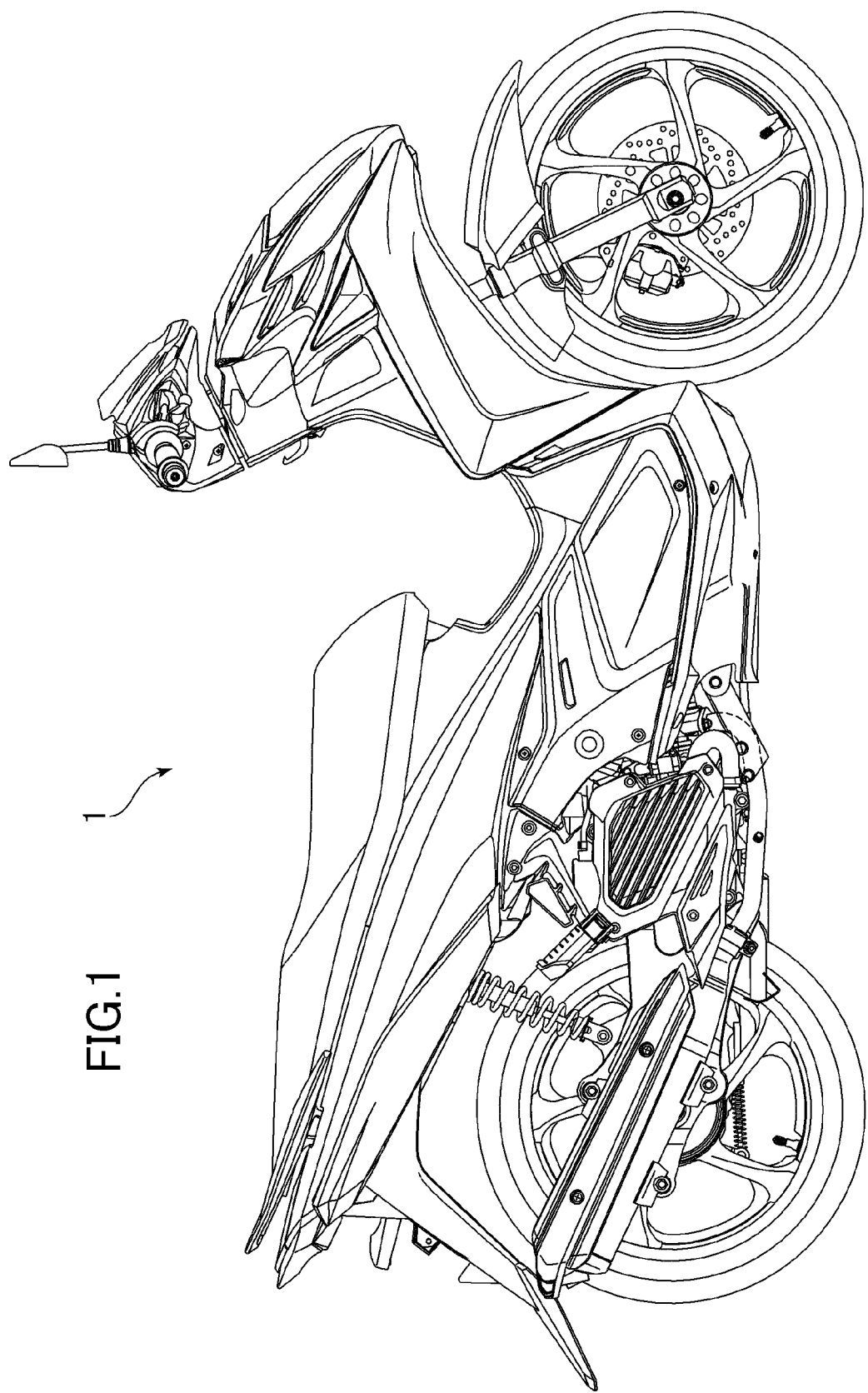
FIG. 1 is a side view of a vehicle according to a preferred embodiment of the present invention.

FIG. 1 is a side view of a vehicle 1 according to a preferred embodiment of the present invention. In this preferred embodiment, the vehicle 1 is exemplified by a motorcycle, for example. However, the vehicle covered by the preferred embodiments of the present invention is not limited to a motorcycle, and the preferred embodiments of the present invention may cover any motorized vehicle provided with a transmission in which a rotary shift drum is used. In general, vehicles using a rotary shift drum often have a relatively small-size and are light-weight. Examples of these vehicles include a sports car, a racing car, and various kinds of straddle type vehicles provided with a saddle that a rider sits astride, the straddle type vehicles including, for example, a motorcycle, a motor tricycle, a three-wheeled or four-wheeled buggy called an All Terrain Vehicle (ATV), and a snowmobile.

Transmissions in which a rotary shift drum is used are often so-called dog-clutch type transmissions. The transmission according to the present preferred embodiment preferably is also a dog-clutch type transmission, but the preferred embodiments of the present invention are not necessarily limited to this type of transmission.

Figure 2:
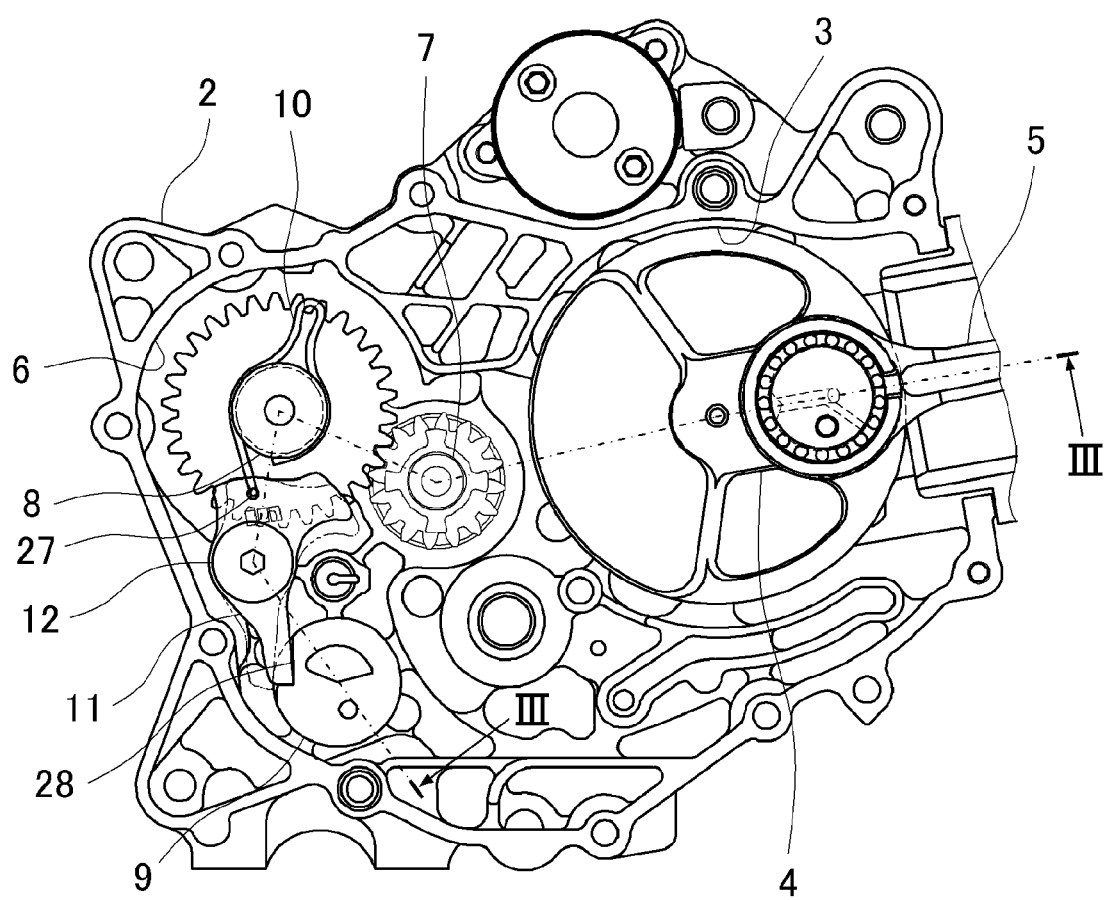
FIG. 2 is a partial sectional view of an engine and a transmission of the vehicle according to a preferred embodiment of the present invention taken along a plane perpendicular to a crankshaft.

FIG. 2 is a partial sectional view of an engine and a transmission of the vehicle 1 taken along a plane perpendicular to a crankshaft. FIG. 2 partially illustrates an inside of a crank room 3 provided in an engine case 2 doubling as a crankcase and a transmission case, a crankshaft 4, and a piston 5 connected to the crankshaft 4. Further, FIG. 2 illustrates a transmission room 6 including an input shaft 7 which rotates synchronously with the crankshaft 4 through an intermediate clutch, an output shaft 8 which rotates synchronously with a rear wheel serving as a driving wheel, and a rotary shift drum 9 which engages with a shift fork to drive a slide gear fitted on each of the input shaft 7 and the output shaft 8. Further, FIG. 2 illustrates a friction spring 10 which is frictionally engaged on an outer periphery of the output shaft 8, and a rocker arm 11 which is biased by the friction spring 10. The rocker arm 11 is supported on the engine case 2 with, for example, a pivot bolt 12 so as to be rotatable.

Figure 3:
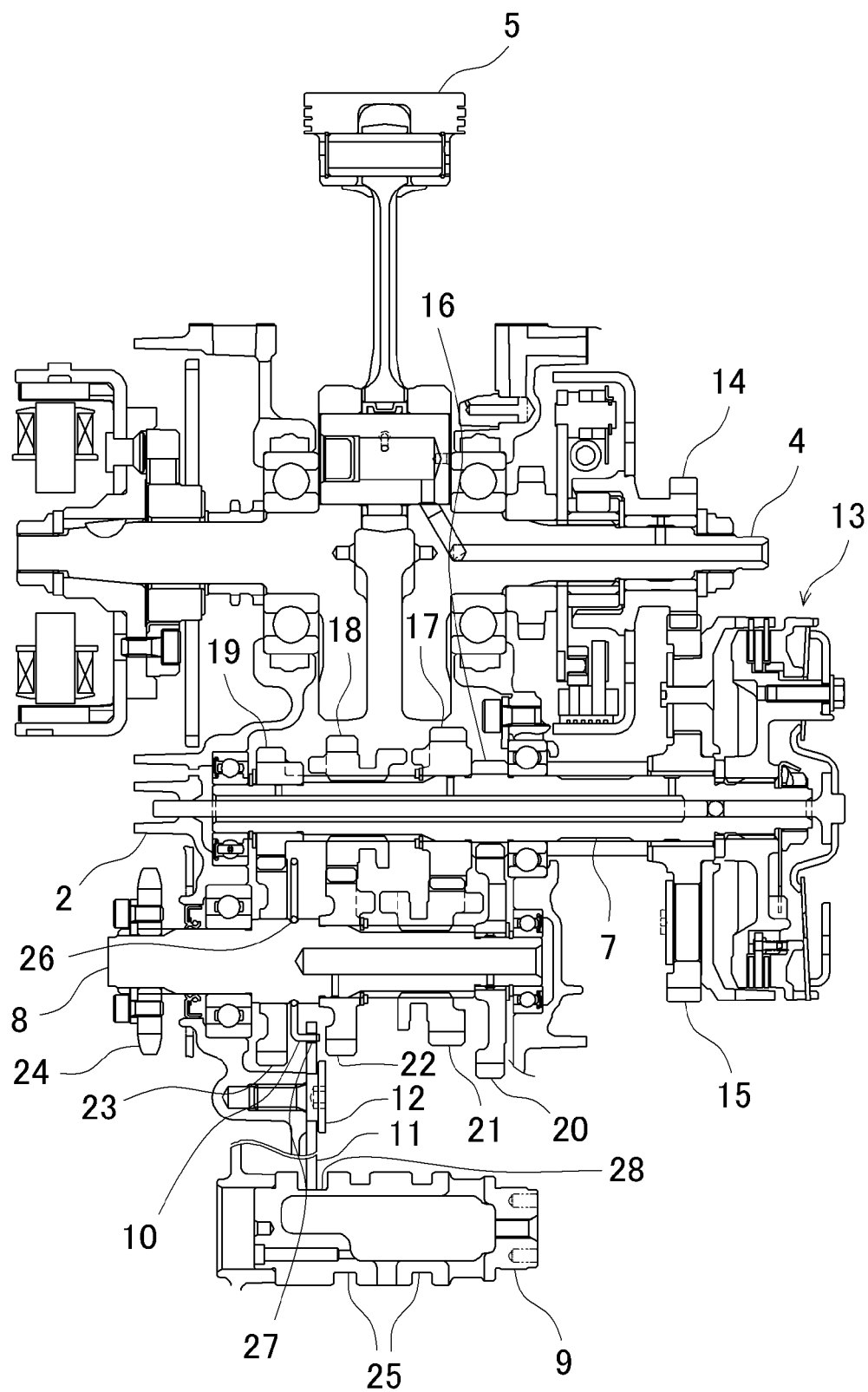
FIG. 3 is a sectional view taken along the line III-III of FIG. 2.

FIG. 3 is a sectional view taken along the line III-III of FIG. 2. The line III-III of FIG. 2 passes through a center line of the piston 5, and respective centers of the crankshaft 4, the input shaft 7, the output shaft 8, the pivot bolt 12, and the shift drum 9.

A rotational driving force of the engine obtained from rotation of the crankshaft 4 is transmitted to the input shaft 7 through an intermediate clutch 13 by a driven gear 15 which meshes with a drive gear 14 fixed to an end portion of the crankshaft 4. A first input gear 16, a fourth input gear 17, a third input gear 18, and a second input gear 19 are provided on the input shaft 7 in the stated order from the driven gear 15 side. Further, on the output shaft 8 arranged in parallel or substantially parallel to the input shaft 7, a first output gear 20 is provided at a position so as to mesh with the first input gear 16, a fourth output gear 21 is provided at a position so as to mesh with the fourth input gear 17, a third output gear 22 is provided at a position so as to mesh with the third input gear 18, and a second output gear 23 is provided at a position so as to mesh with the second input gear 19. Gear ratios established by the respective gears are determined as follows: the first input gear 16 and the first output gear 20 establish 1st gear, the second input gear 19 and the second output gear 23 establish 2nd gear, the third input gear 18 and the third output gear 22 establish 3rd gear, and the fourth input gear 17 and the fourth output gear 21 establish 4th gear. A chain sprocket 24 is fixed to an end portion of the output shaft 8, and the output shaft 8 rotates synchronously with the driving wheel via a chain and a final reduction mechanism (not shown).

In this case, the first input gear 16 serves as an input-shaft-side stationary gear which is stationary with respect to the input shaft 7 in both an axial direction and a rotational direction. The fourth input gear 17 and the second input gear 19 each serve as an input-shaft-side rotary gear which is stationary in the axial direction and free to rotate in the rotational direction with respect to the input shaft 7. The third input gear 18 serves as an input-shaft-side slide gear which is movable in the axial direction and restricted from rotating in the rotational direction with respect to the input shaft 7. Further, the first output gear 20 and the third output gear 22 each serve as an output-shaft-side rotary gear which is stationary in the axial direction and free to rotate in the rotational direction with respect to the output shaft 8. The fourth output gear 21 serves as an output-shaft-side slide gear which is movable in the axial direction and restricted from rotating in the rotational direction with respect to the output shaft 8. The second output gear 23 serves as an output-shaft-side stationary gear which is stationary with respect to the output shaft 8 in both the axial direction and the rotational direction. In this preferred embodiment, the first input gear 16 preferably is integral with the input shaft 7, and the second output gear 23 is fixed to the output shaft 8 by being, for example, press-fitted into the output shaft 8. Note that, a "stationary gear" herein refers to a gear which is stationary in both the axial direction and the rotational direction with respect to a shaft with which the gear is engaged. Further, a "rotary gear" refers to a gear which is stationary in the axial direction and free to rotate in the rotational direction (that is, idle) with respect to a shaft with which the gear is engaged. Still further, a "slide gear" refers to a gear which is movable in the axial direction and restricted from rotating in the rotational direction with respect to a shaft with which the gear is engaged.

Cam grooves 25 are provided in a surface of the shift drum 9 arranged in parallel or substantially parallel to the input shaft 7 and the output shaft 8, and shift forks (not shown) engage with the cam grooves 25. In this preferred embodiment, two shift forks are provided, for example. One of the shift forks engages also with the third input gear 18 serving as a slide gear, and the other of the shift forks engages also with the fourth output gear 21. Thus, in accordance with rotation of the shift drum 9, the two shift forks move in parallel or substantially parallel to the axial direction, to thereby drive in the axial direction the third input gear 18 and the fourth output gear 21 each serving as a slide gear. With this structure, when a rider shifts gears to rotate the shift drum 9 by a predetermined angle, each slide gear moves in the axial direction to mesh with an adjacent gear by dogs, or to release the meshing engagement. As a result, the gear ratios are changed. FIG. 3 illustrates a neutral state in which power is not transmitted from the input shaft 7 to the output shaft 8. When the shift drum 9 is rotated under this neutral state in a constant direction, the gear ratios are changed in the order of 1st gear, 2nd gear, 3rd gear, and 4th gear. When the shift drum is further rotated, the shift drum 9 makes one revolution to return to the illustrated neutral state again.

A circumferential recessed groove 26 is provided in an outer periphery of the output shaft 8, and the friction spring 10 is frictionally engaged in the recessed groove. The friction spring 10 is preferably formed, for example, by bending a suitable material such as a steel wire. The friction spring 10 preferably has a shape as illustrated in FIG. 2, and thus fastens to the output shaft 8 due to its own elastic force. Accordingly, a frictional force acts between the friction spring 10 and the output shaft 8. When the output shaft 8 rotates, the friction spring 10 also rotates along with the output shaft 8 in the same direction. One end of the friction spring 10 is bent in the axial direction, and engages in an engagement hole 27 provided in the rocker arm 11. The rocker arm 11 is supported by the pivot bolt 12 so as to be rotatable about a position different from a rotation center of the output shaft 8. When the output shaft 8 rotates, the rocker arm 11 is biased by the friction spring 10 to rotate in a direction reverse to the rotating direction of the output shaft 8 and the friction spring 10. In this preferred embodiment, in a state in which the vehicle 1 runs in a forward direction, the output shaft 8 rotates clockwise in FIG. 2, and hence the rocker arm 11 is biased counterclockwise in this state. Further, a distal end of the rocker arm 11 extends toward the shift drum 9. When the rocker arm 11 is biased counterclockwise, the distal end of the rocker arm 11 is pressed onto the shift drum 9. That is, in accordance with rotation of the output shaft 8, the rocker arm 11 is biased by the friction spring 10 toward the shift drum 9. An engagement recessed portion 28 is provided as a recess in a portion of the shift drum 9 which comes into contact with the distal end of the rocker arm 11. In a case where the distal end of the rocker arm 11 and the engagement recessed portion 28 engage with each other as illustrated in FIG. 2, one-way rotation of the shift drum 9, i.e., clockwise rotation thereof in the illustrated example, is prevented. A position and a direction of the engagement recessed portion 28 are set at a position and a direction that the distal end of the rocker arm 11 passes when the shift drum 9 is rotated from 4th gear to the neutral position. Thus, during a period in which the output shaft 8 is rotating, shifting from 4th gear to neutral is prohibited. Therefore, the following three members constitute a rotary stopper mechanism: the friction spring 10 which is frictionally engaged in the recessed groove 26 provided in the outer periphery of the output shaft 8, the rocker arm 11, and the engagement recessed portion 28 provided in the shift drum 9.

With reference to FIG. 3, the recessed groove 26, with which the friction spring 10 is frictionally engaged, is provided directly in the outer periphery of the output shaft 8 at a position between the second output gear 23 and the third output gear 22 and adjacent to the second output gear 23, and one end of the friction spring 10 is bent in a direction as to separate from the second output gear 23. Those points are described below. First, the recessed groove 26 and the friction spring 10 are provided directly on the outer periphery of the output shaft 8, and thus a diameter of a member to be nipped by the friction spring 10 is reduced as compared to a case where the friction spring 10 is provided on another member, for example, on a portion of a gear provided on the output shaft 8 or on a member such as a collar. This means that, in a case where the output shaft 8 is rotating, a relative velocity between the friction spring 10 and a member with which the friction spring 10 is frictionally engaged is reduced as compared to the above-mentioned case where the friction spring 10 is provided on another member. Further, an amount of heat generated by friction depends on a relative velocity between rubbing members, and hence the structure in which the friction spring 10 is provided directly on the outer periphery of the output shaft 8 can minimize the amount of heat generated by friction. In addition, processing of the recessed groove 26 in the output shaft 8 is performed easily at a low cost, and hence it is unnecessary to provide a gear having a special shape or to prepare a member such as a collar, which further achieves a cost reduction.

Between the second output gear 23 serving as the output-shaft-side stationary gear and the third output gear 22 serving as the output-shaft-side rotary gear, there is required an allowance for axial movement of the third input gear 18 serving as the input-shaft-side slide gear which meshes with the third output gear 22, and hence a slight gap needs to be provided. The recessed groove 26 and the friction spring 10 are arranged in this gap, and thus it is unnecessary to extend the output shaft 8 for the purpose of providing the rotary stopper mechanism, or it is possible to minimize the extension of the output shaft 8. As a result, an increase in cost and weight is avoided.

In addition, the recessed groove 26 is arranged at the position adjacent to the second output gear 23, and thus it is possible to relax stress generated at a corner of a coupling portion between the second output gear 23 and the output shaft 8. That is, the recessed groove 26 doubles as the stress relaxation structure for a stress which is generated at the output shaft 8 by torque acting on the second output gear 23.

Note that, in the present preferred embodiment, as described above, the second output gear 23 is preferably fixed to the output shaft 8 by being press-fitted into the output shaft 8. The second output gear 23 is preferably press-fitted from a direction opposite to the recessed groove 26. Thus, it is possible to avoid damage of the second output gear 23 or the output shaft 8, which is caused when the second output gear 23 slides across the recessed groove 26 at the time of manufacture.

When the friction spring 10 is frictionally engaged directly on the output shaft 8 and a diameter of a member to be nipped by the friction spring 10 is reduced, a radial position subjected to action of a frictional force becomes closer to a center. Accordingly, torque acting on the friction spring 10 is slightly reduced, and a force of biasing the rocker arm 11 is slightly reduced. This torque is increased by increasing a fastening force exerted by the friction spring 10, but this method leads to an increase in the amount of heat generated, and hence is sometimes undesirable. Therefore, in the present preferred embodiment, the rocker arm 11 is supported so as to be rotatable about the position different from the rotation center of the output shaft 8, and thus it is possible to increase a force of pressing the distal end of the rocker arm 11 onto the shift drum 9 as compared to a case where the rocker arm 11 is provided coaxially with the output shaft 8.

Note that, in the above-mentioned preferred embodiment, the engine case 2 doubles as the crankcase and the transmission case, and the engine and the transmission are integrated with each other. However, preferred embodiments of the present invention are not limited thereto, and the engine and the transmission may be independent of each other. Further, in the present preferred embodiment, the transmission refers to a portion of the engine case 2 functioning as the transmission case and to a member accommodated inside the transmission case. In addition, in the present preferred embodiment, a single-cylinder and 4-stroke engine is exemplified as the engine, but preferred embodiments of the present invention are not limited thereto. The engine may be a multi-cylinder engine or a 2-stroke engine, for example.

Figure 4:
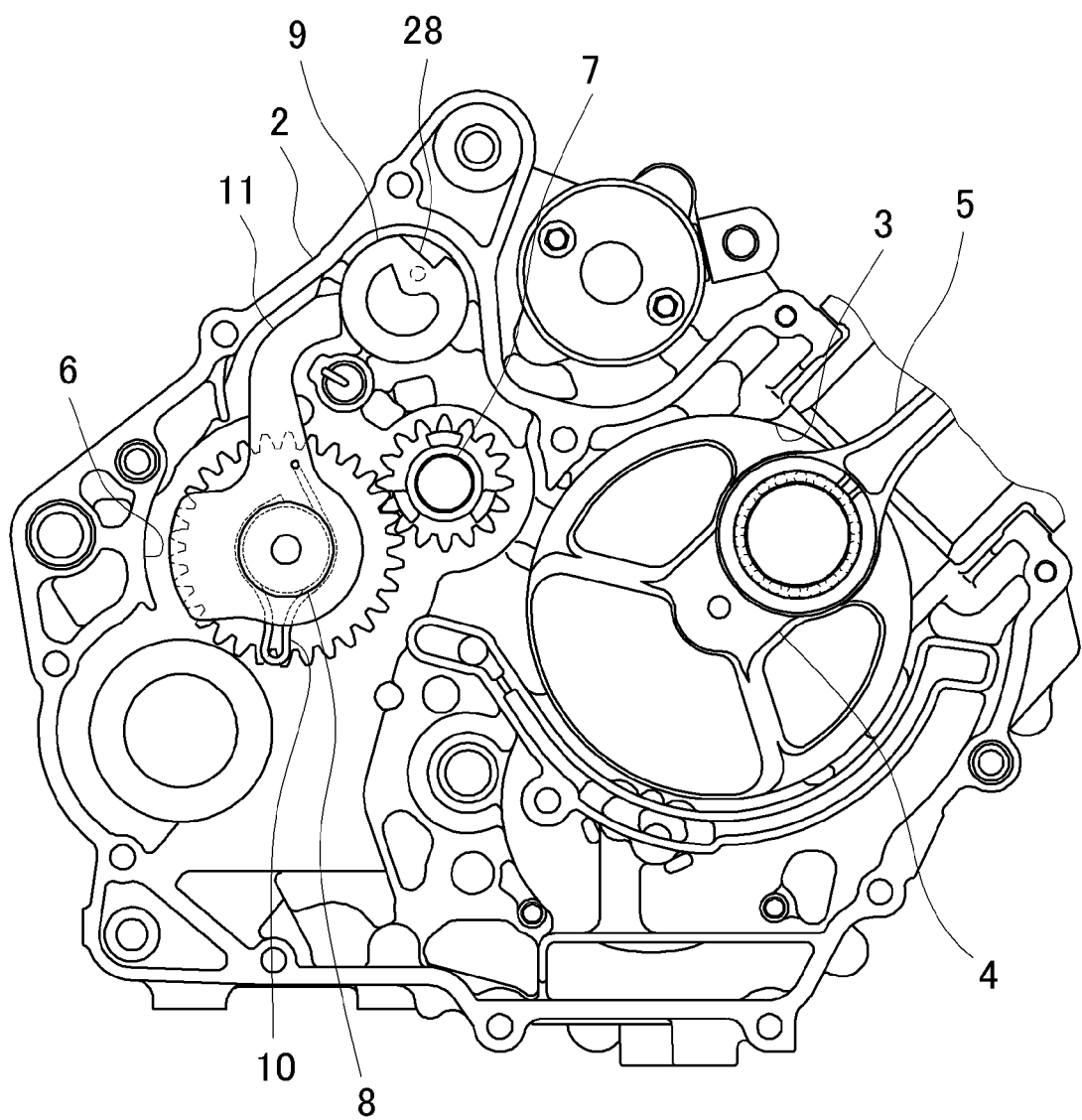
FIG. 4 is a partial sectional view of an engine and a transmission of a vehicle according to a modified preferred embodiment of the present invention taken along a plane perpendicular to a crankshaft.

FIG. 4 is a partial sectional view of an engine and a transmission of the vehicle 1 according to a modified preferred embodiment of the present invention taken along a plane perpendicular to a crankshaft. The structure illustrated in FIG. 4 is different from the structure of the above-mentioned preferred embodiments in that the rocker arm 11 is arranged so as to be coaxial with the output shaft 8 and rotatable with respect to the output shaft 8. In a case where a force of biasing the rocker arm 11 by the friction spring 10 does not matter for reliably operating the rotary stopper mechanism, the structure according to this modification may be used instead of a separate pivotally supported rocker arm 11 as in the above-mentioned preferred embodiments. In this modification, the structure for the separate pivotally supported rocker arm 11 is not needed, and hence there is an advantage in that the rotary stopper mechanism is simplified. Also in this modification, the friction spring 10 is frictionally engaged in a circumferential recessed groove provided in the outer periphery of the output shaft 8.

The above-mentioned preferred embodiments and modifications describe the transmission and the vehicle by way of example, but the present invention is not limited to the specific examples described above. A person skilled in the art may change a detailed shape, arrangement, and the number of each member arbitrarily as needed. For example, in the above-mentioned preferred embodiments and modifications, the number of speeds of the transmission is four, but the transmission may have a larger number of speeds such as five, six, or more, or may have three speeds, for example. Further, in the above-mentioned preferred embodiments and modifications, the slide gear is provided on each of the input shaft 7 and the output shaft 8, but preferred embodiments of the present invention are not limited thereto. The slide gear may be provided on any one of the input shaft 7 and the output shaft 8. That is, it is only necessary that the slide gear be provided on at least one of the input shaft 7 and the output shaft 8. In addition, description is made of a case where the second output gear 23 serving as the output-shaft-side stationary gear is fixed to the output shaft 8 by being press-fitted into the output shaft 8, but preferred embodiments of the present invention are not limited thereto. The second output gear 23 may be fixed through shrink fitting or with a key, or may be fixed with a mechanical device such as a so-called mechanical lock.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A transmission comprising:
    an input shaft that rotates synchronously with a crankshaft of an engine through an intermediate clutch;
    an output shaft that rotates synchronously with a driving wheel;
    a rotary shift drum that engages with a shift fork to drive at least one of a slide gear fitted on the input shaft and a slide gear fitted on the output shaft; and
    a rotary stopper mechanism including:
        a friction spring frictionally engaged in a circumferential recessed groove provided in an outer periphery of the output shaft;
        a rocker arm biased by the friction spring toward the rotary shift drum in accordance with a rotation of the output shaft; and
        an engagement recessed portion provided in an outer periphery of the rotary shift drum to restrict rotation of the rotary shift drum through engagement with the rocker arm.

2. The transmission according to claim 1, wherein the circumferential recessed groove is arranged between an output-shaft-side stationary gear, which is mounted to the output shaft so as to be stationary with respect to the output shaft in both an axial direction and a rotational direction, and an output-shaft-side rotary gear, which is mounted to the output shaft so as to be stationary in the axial direction and free to rotate in the rotational direction with respect to the output shaft.

3. The transmission according to claim 2, wherein the slide gear fitted on the input shaft is arranged to move in the axial direction so as to switch between a state in which the output-shaft-side stationary gear and the input shaft rotate synchronously with each other and a state in which the output-shaft-side rotary gear and the input shaft rotate synchronously with each other.

4. The transmission according to claim 2, wherein the circumferential recessed groove is arranged at a position adjacent to the output-shaft-side stationary gear.

5. The transmission according to claim 2, wherein the output-shaft-side stationary gear is press-fitted to the output shaft from a direction opposite to the circumferential recessed groove.

6. The transmission according to claim 1, wherein the rocker arm is supported so as to be rotatable about a position different from a rotation center of the output shaft.

7. A vehicle comprising:
the transmission according to claim 1.

* * * * *